United States Patent

[11] 3,609,567

[72] Inventors James F. Webb
Administrator of the National Aeronautics and Space Administration with respect to an invention of;
William J. Kerwin; Lawrence P. Huelsman, Tucson, Ariz.

[21] Appl. No. 28,235
[22] Filed Apr. 17, 1970
[45] Patented Sept. 28, 1971
Continuation of application Ser. No. 624,611, Mar. 20, 1967, now abandoned.

[54] RC NETWORKS AND AMPLIFIERS EMPLOYING THE SAME
19 Claims, 14 Drawing Figs.

[52] U.S. Cl. .......... 328/167, 307/295, 330/176, 330/109, 333/70 CR
[51] Int. Cl. .......... H03f 1/00
[50] Field of Search .......... 328/167; 333/70, 80; 330/109, 176, 97; 307/295, 239

[56] References Cited

OTHER REFERENCES

" A Tunable Solid-Circuit Filter Suitable for an IF Amplifier" by Price et al., Electronic Engineering December 1963 pp. 806– 812

*Primary Examiner*—Donald D. Forrer
*Assistant Examiner*—Harold A. Dixon
*Attorneys*—Darrel G. Brekke and G. T. McCoy

ABSTRACT: The active filter circuit of the present invention comprises a passive RC network and a DC voltage or operational amplifier. The resistive and capacitive elements of the passive RC network determine the location of a pair of complex conjugate zeros along the $j\omega$ axis. Connected to the RC network in shunt are a load resistor and a load capacitor. A feedback network interconnects the output of the voltage amplifier with the passive RC network. By regulating the value of the load resistor and the value of the load capacitor jointly or severally, the location of a pair of complex conjugate poles produced by the active filter can be adjusted separately and independently from the zeros. In addition thereto, the regulation of the gain of the DC voltage or operational amplifier or the changing of the feedback voltage of the DC voltage or operational amplifier adjusts independently the location of the pair of complex conjugate poles relative to the zeros.

When a plurality of active filter circuits are connected in cascade, a frequency-selective amplifier is formed with the d-c voltage or operational amplifiers serving additionally as isolation devices between successive active filter circuits. It is to be observed that each active filter circuit produces real frequency zeros of transmission at any desired frequency independently of the location of complex poles with respect the zeros.

INVENTORS.
WILLIAM J. KERWIN
LAWRENCE P. HUELSMAN
BY
ATTORNEYS

INVENTORS.
WILLIAM J. KERWIN
LAWRENCE P. HUELSMAN
BY
ATTORNEYS

INVENTORS.
WILLIAM J. KERWIN
LAWRENCE P. HUELSMAN
BY [signature]
[signature]
ATTORNEYS

INVENTORS.
WILLIAM J. KERWIN
LAWRENCE P. HUELSMAN
BY
ATTORNEYS

RC NETWORKS AND AMPLIFIERS EMPLOYING THE SAME

This application is a continuation of U.S. Pat. application Ser. No. 624,611 filed Mar. 20, 1967, now abandoned. The invention described herein was made in the performance of work under a NASA contract and is subject to the provisions of Section 305 of the National Aeronautics and Space Act of 1958, Public law 85-568 (72Stat. 435; 42 U.S.C. 2457).

The present invention relates in general to filter circuits and more particularly to active RC networks and amplifiers employing the same.

In probes for deep-space magnetic field measurement, it is an important object to reduce the overall weight and size of electronic instruments and equipment and to eliminate all magnetic material therefrom. Whenever possible, it is highly desirable to employ integrated circuit techniques in the construction of electronic instruments and equipment. It has been found that transformers and inductors are bulky, heavy and produce unwanted magnetic effects. Further, integrated circuits do not lend themselves to circuits employing inductors or transformers. At present, it appears that integrated circuits cannot employ inductors larger than a few microhenries.

Accordingly, an object of the present invention is to provide an active filter network that eliminates the use of inductors and transformers without sacrificing the availability of transfer functions.

Another object of the present invention is to provide an active filter network which is suitable for integrated circuit techniques.

Another object of the present invention is to provide a frequency-selective amplifier wherein active RC networks are connected in cascade and the DC voltage or operational amplifiers of the respective active RC networks additionally serve as isolation devices between successive active RC networks.

Another object of the present invention is to provide a frequency-selective amplifier without the use of transformers or inductors which allows independent adjustment of the pole and zero positions and provides for zeros at DC and at finite frequencies, whereby low-pass, high-pass, band-pass and band-rejection amplifiers are realized with maximally flat amplitudes or time delay, equal ripple-pass and stop-band characteristics, or phase equalizers.

Another object of the present invention is to provide an improved inductanceless filter amplifier.

Another object of the present invention is to provide a frequency-selective amplifier which allows higher frequency performance.

Another object of the present invention is to provide a frequency-selective amplifier with improved overall gain, sensitivity and stability for prescribed transfer functions.

The present invention provides a frequency-selective amplifier formed from a plurality of active RC networks connected in cascade without the use of transformers or inductors which allow independent adjustment of pole positions relative to the zero positions and the independent location of zero positions along the $j\omega$ axis including DC and infinity. This allows the realization of low-pass, high-pass, band-pass and band-rejection amplifiers of maximally flat amplitudes or time delay, equal ripple-pass and stop-band characteristics, or phase equalizers.

Other and further objects and advantages of the present invention will be apparent to one skilled in the art from the following description taken in conjunction with the accompanying drawings, in which.

Figure 1:
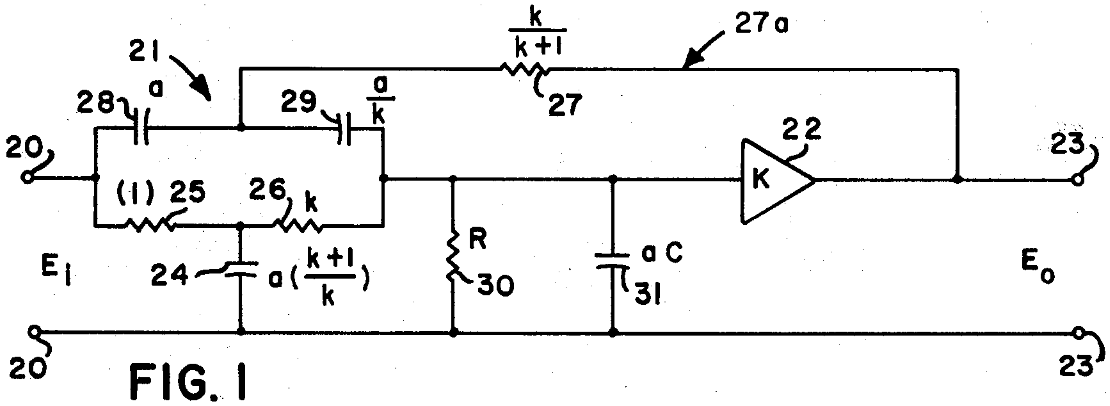
FIG. 1 is a schematic circuit diagram of an active RC filter element embodying the present invention.
Figure 4:
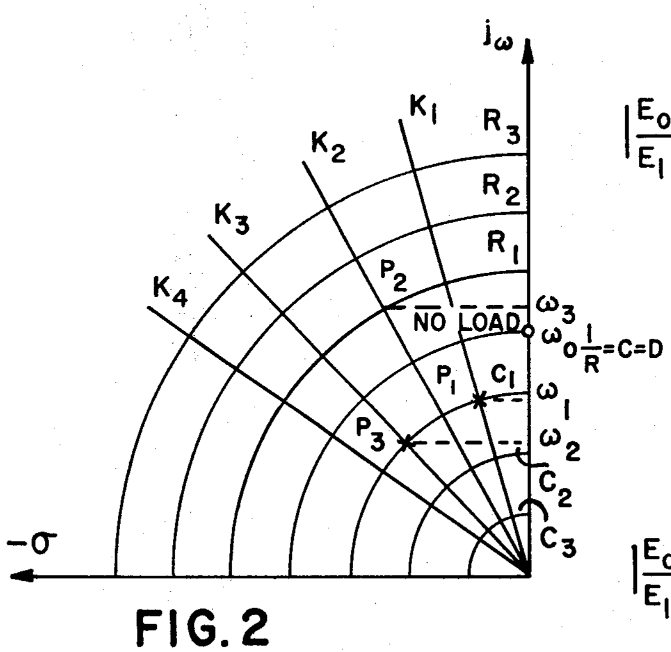
Figure 2:
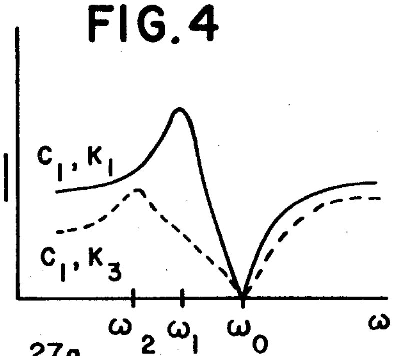
FIG. 2 is a graph illustrating certain characteristics of the transfer function of the filter element of FIG. 1 on a complex frequency plane.
Figure 5:
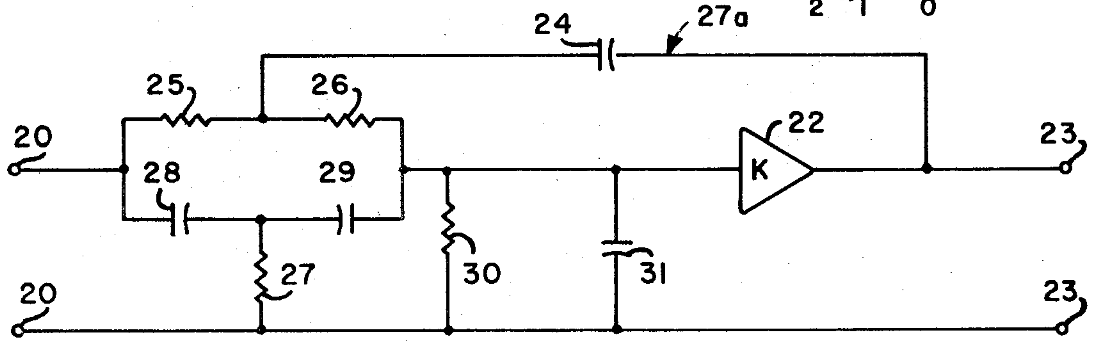
Figure 6:
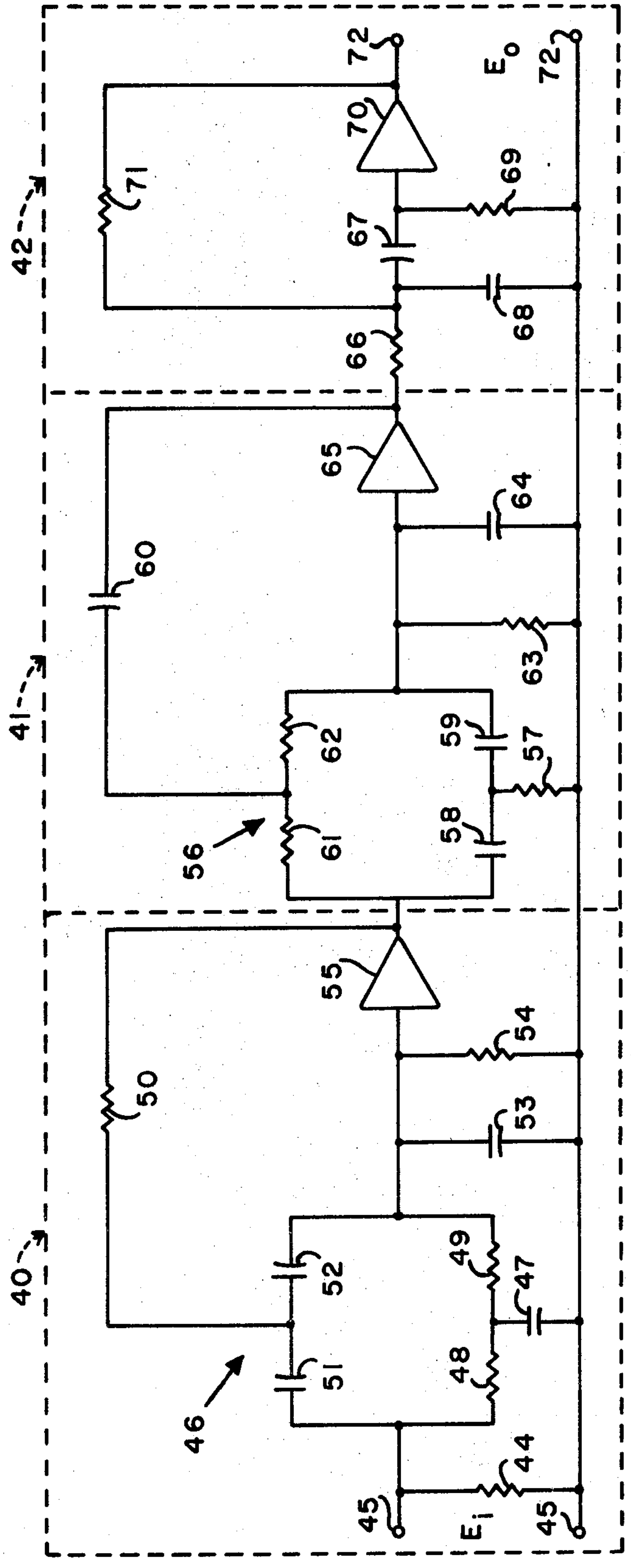
Figure 7:
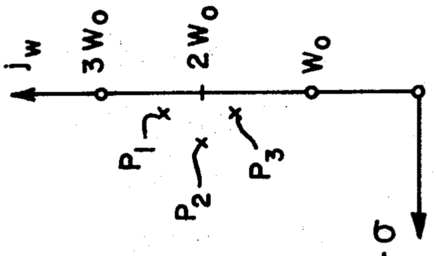
Figure 8:
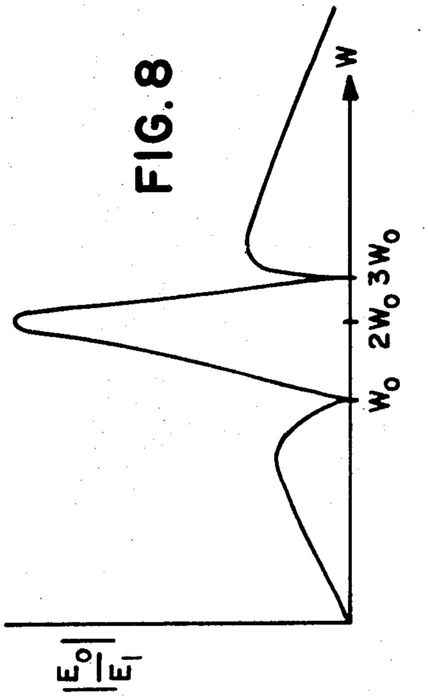
Figure 11:
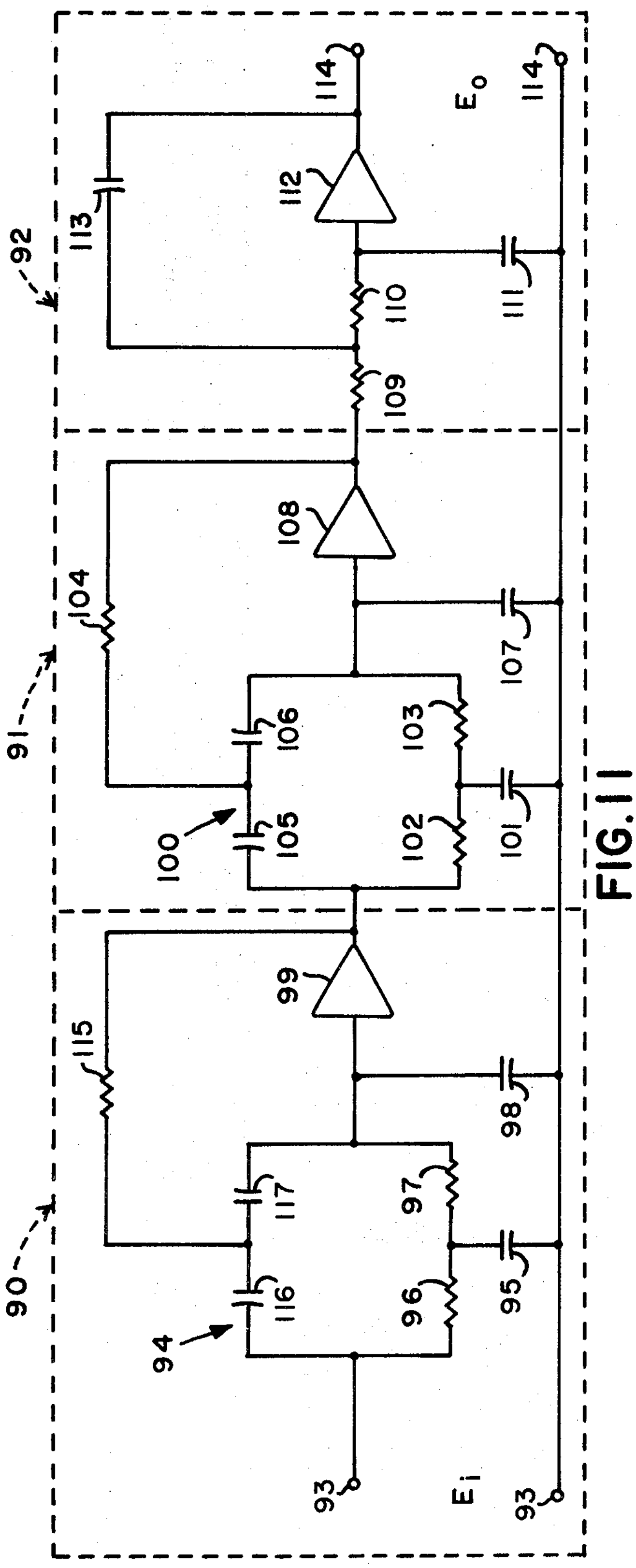
Figure 10:
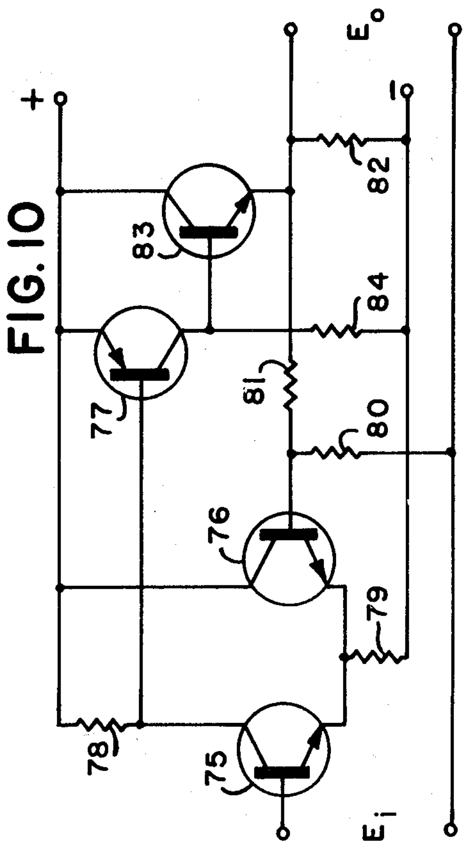
Figure 9:
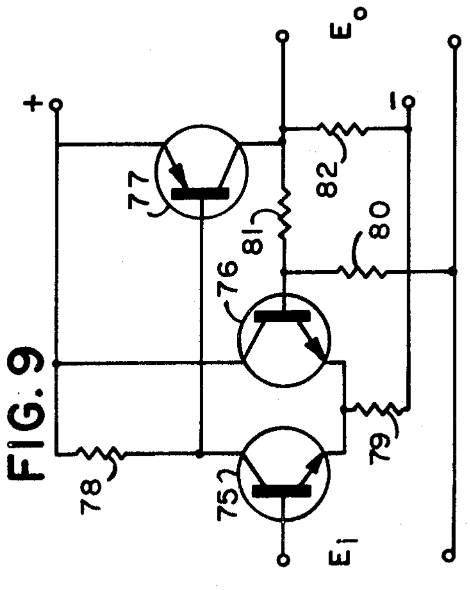
Figures 12, 13:
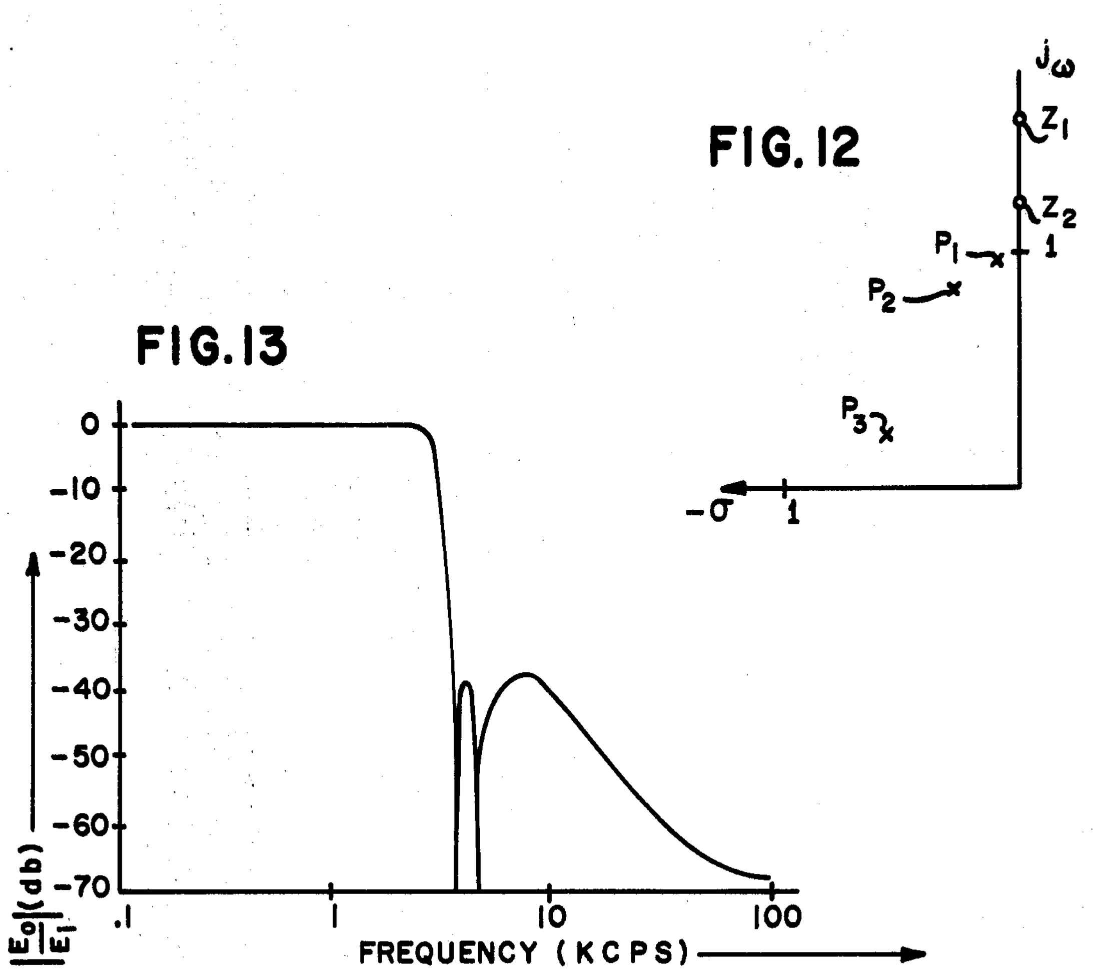

FIG. 4. is a plot of the frequency response of the filter element of FIG. 1 for certain other conditions shown in FIG. 2;

FIG. 5 is a schematic circuit diagram of an alternative form of active RC filter element embodying the present invention:

FIG. 6 is a schematic circuit diagram of a three-stage band-pass filter embodying the present invention;

FIG. 7 is a complete pole-zero plot illustrating the location of the poles and zeros of the transfer function for the filter of FIG. 6 and showing an upper left quadrant only;

FIG. 8 is a plot of the frequency response for the filter of FIG. 6;

FIG. 9 is a schematic circuit diagram of DC voltage amplifier employed in the active RC filters of the present invention;

FIG. 10 is a schematic circuit diagram of a modified form of the amplifier of FIG. 9;

FIG. 11 is a schematic circuit diagram of a three-stage low-pass filter embodying the present invention;

FIG. 12 is a complex pole-zero plot illustrating the location of the poles and zeros of the transfer function for the filter of FIG. 11 and showing an upper left quadrant only;

FIG. 13 is a plot of the frequency response for the filter of FIG. 6; and

Figure 14:
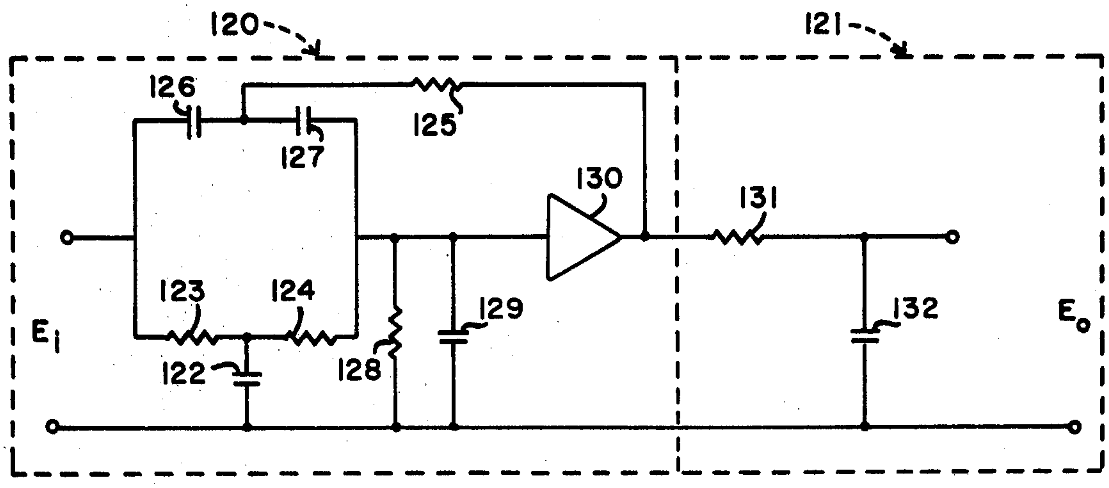

FIG. 14 is a schematic circuit diagram of a two-stage low-pass filter embodying the present invention.

Briefly described, a passive RC network is connected to the input of DC voltage or operational amplifier to form an active RC network. A feedback network is connected from the output of the DC voltage or operational amplifier to the passive RC network. A load resistor and/or a load c apacitor are connected in shunt with the passive RC network. It is the magnitudes of the resistive elements and the capacitive elements in the passive RC network that determine the location of a pair of zeros along the $j\omega$ axis. By regulating the magnitude of the load resistive element and the load capacitance element jointly or severally, the location of a pair of poles can be adjusted separately and independently from the zeros. In addition thereto, control over the gain of the voltage amplifier and control over its feedback voltage can independently adjust the location of the pair of poles with respect to the zeros.

The frequency-selective amplifier of the present invention comprises a plurality of the active RC networks connected in cascade, with the DC voltage amplifiers of the active RC networks serving as isolation devices between successive active RC networks. In the preferred embodiment, these elements are formed on a monolithic semiconductor structure employing microelectronic and integrated circuit techniques.

One form of filter element in accordance with the present invention is shown in FIG. 1. An input voltage signal $E_i$ is applied to input terminals 20 of a passive RC network 21 which is connected in feedback relationship with a voltage amplifier 22 to thereby form an active RC filter. The components of this active filter can be designed to reject any desired frequency and to independently obtain any desired second-order response at the other frequencies. An output voltage $E_o$, thus filtered, is developed at output terminals 23. This independent adjustment of rejection and response permits any desired frequency response characteristic to be obtained by simple cascading of individual filter elements of the type shown in FIG. 1.

The passive RC network 21 includes a twin-T configuration in which one T comprises a leg capacitance 24 and arm resistances 25 and 26 and the other T comprises a leg resistance 27 and arm capacitances 28 and 29. Connected in shunt with this twin-T configuration are a load resistance 30 and a load capacitan ce 31.

In operation, the input voltage $E_i$ is applied across the T of these twin-T circuit 21, and the input to amplifier 22 is developed across lead element 30 and 31. The output of amplifier 22 is fed back through a resistance 27 of a feedback network 27*a* and thereby reintroduced across the circuit 21. The circuit of FIG. 1 thereby functions as an active RC filter element between input terminals 20 and the output terminals 23. The characteristics of this filter element will now be described. The transfer function of a network may be expressed as the ratio of two polynomials in $p$ ($p=\sigma+j\omega$) having real coefficients. The roots of the numerator are defined as zeros and the roots of the denominator are defined as poles. A pole is simply a value of $p$ which causes the denominator to be zero, etc. In order to obtain a graphical illustration of the poles and zeros of a particular network transfer function, the locations of these roots may be plotted in the complex plane wherein the $x$ -axis is designated the $\sigma$-axis and the $y$-axis is designated the $j\omega$-axis. The complex plane is commonly referred to as the $p$-plane. The steady-state transfer function $E_0/E_i$ of the filter element of FIG. 1 may be expressed as follows:

$$\frac{E_0}{E_i}=\frac{H(p^2+\alpha)}{p^2+\beta p+\gamma} \qquad (1)$$

where, $H$, $\alpha$, $\beta$ and $\gamma$ are constants, and $p$ is the complex frequency variable $\sigma+j\omega$. The characteristics of this transfer function will be described by reference to FIG. 2 which illustrates various relationships in the $p$-plane.

The zeros of equation (1), where the numerator is zero, are at $p=\pm j\sqrt{\alpha}$.These are conjugate values located on the $j\omega$-axis at equal distances from the $\sigma$-axis. The value with the plus sign is the resonance rejection frequency $\omega_0$ of the passive RC circuit 21. This zero is located on the $p$-plane of FIG. 2 by the symbol "0" and labeled $\omega_0$. The network of Figure 1 has complete rejection at $\omega_0$.

The denomination of equation (1) is a quadratic and thus the poles of transmission are found by using the well-known formula for solving the roots of quadratic equations. Accordingly, the poles are at $$p=\frac{-\beta\pm j\sqrt{\beta^2-4\gamma}}{2}$$

The Q of the network is approximately equal to $\frac{\sqrt{\gamma}}{\beta}$. Since the position of the poles is dependent on both $\gamma$ and $\beta$, one selecting poles for the network can strike a $\gamma$ to $\beta$ balance that will achieve a Q desideratum. Obviously, the network will increase as $\beta$ decreases (the pole approaches the $j\omega$ axis).

Any desired second-order amplitude response can be achieved by locating a pole of the function of equation (1) in the proper position in the $p$-plane. That is, it is required that the poles of the function be located in the $p$plane independently of the zeros of the function. A pole located at $p_n=\sigma_n+j\omega_n$ will have a maximum response near $\omega_n$. The sharpness or Q of this response will depend on the size of the real component $\sigma_n$. If $\sigma_n$ is equal to zero, the Q is infinite and the system will oscillate at $\omega_n$. As $\sigma_n$ increases, the Q of the response at $\omega_n$ correspondingly decreases. Positive values of $\sigma_n$ represent unstable configurations and are not relevant to the present discussion.

Typical pole-zero plots of low-pass, high-pass, band-pass and band-elimination transfer functions are depicted in chapter 3, "The Poles and Zeros of Networks," Circuit Theory and Design, John L. Stewart, John Wiley & Sons, Inc., 1956.

In the filter of FIG. 1, a pole, corresponding to a value of p at which the denominator of equation (1) is equal to zero, can be located anywhere in the upper left quadrant of the $p$-plane by properly choosing the capacitance C and the resistance R of the shunt load elements 30, 31 and the gain K of the amplifier 22. Each pole so located will have a corresponding conjugate pole in the lower left quadrant. Since only the response along the $+j\omega$-axis has physical meaning, the discussion will be limited to the upper left quadrant as shown in Fig. 2. If no shunt load is placed across the RC circuit 21 ($R=\infty C=0$), the locus of poles as a function of amplifier gain K is a circle labeled as "no load" in FIG. 2, said circle having its center at the intersection of the complex axes and having a radius equal to $\omega_0$. If a resistive load only ($C=0$) is used, then the locus for each value of R is in a concentric circle of radius greater than $\omega_0$, the radius increasing with decreasing R. Thus, as shown in FIG. 2, $R_1>R_2>R_3$. If a capacitive load only [$(1/r)=0$)] is used, then the locus for each value of C is a concentric circle of radius less than $\omega_0$, the radius decreasing with increasing C. Thus, as shown in Figure 2, $C_1<C_2<C_3$. The locus of pole points for a given amplifier gain K can be represented as a line through the common center of the circles, the slope of the line decreasing with increasing K. Thus, as shown in figure 2, the following relationship exists: $K_1>K_2>K_3>K_4$. To position a pole at any position in the upper left-hand quadrant, a shunt impedance is selected corresponding to the R or C circle passing through that point, and an amplifier gain is chosen corresponding to the K-line passing through the same point.

Figure 3:
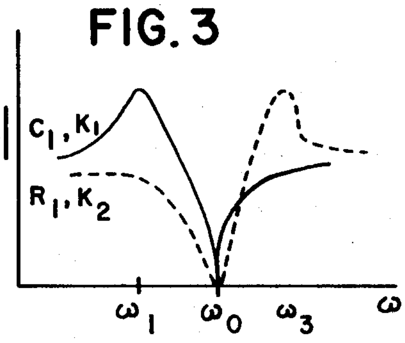
FIG. 3 is a plot of the frequency response of the filter element of FIG. 1 for certain conditions shown in FIG. 2.

To illustrate the foregoing, consider the response $\left|\frac{E_0}{E_i}\right|$ of the filter of FIG. 1, when the pole is located at $p_1$(designated by an "X" in Fig. 2) with $C=C_1$ and $K=K_1$. This pole introduces a peaked response at the frequency approximately $\omega_1$, which is the $j\omega$component of $p_1$, to give a net filter response, as a function of the frequency $\omega$ of input $E_i$, of the form shown by the solid lines of FIGS. 3 and 4. Since this response results from a pair of complex conjugate poles, it is denominated a second-order response.

Suppose, now, that it is desired to flatten the response at $\omega_1$. This may be accomplished by locating the pole at point $p_2$ which has a larger attenuation component $-\sigma$, but the same $j\omega$ component. To locate the pole at $p2$, a resistive load $R_1$ and a decreased amplifier gain $K_2$ are required. Since the rejection frequency always remains fixed at $\omega_0$, the net response is of the form shown by the dashed curve of FIG. 3.

As a further illustration, suppose it is desired to move the peak response from $\omega_1$ to $\omega_2$, with a capacitive load of fixed value $C_1$. This may be accomplished by decreasing the amplifier gain from $K_1$ to $K_3$, thereby changing the location of the pole from $p_1$to $p_3$. Since the attenuation component $-\sigma$ is greater for $p_3$. than for $p_1$,the response at $\omega_2$is flatter than that at $\omega_1$. Again recalling that the rejection frequency is fixed at $\omega_0$, the net response is of the form shown by the dashed curve of FIG. 4.

Referring again to FIG. 1, the values of the various components are labeled in a generalized manner by the introduction of an impedance ratio, $k$, which may be freely chosen, representing the ratio of the impedances of T-arm resistances 25, 26 and T-arm capacitances 28, 29, and of a frequency-scaling parameter $a$. Analysis of the network, as so labeled, yields the following relationships of the elements of FIG. 1 to the constants of equation (1): for resistive loads (c=O) for which $\gamma>\alpha$:

$$\frac{E_o}{E_i}=\frac{H(p^2+\alpha)}{p^2+(\beta p+\alpha)} \qquad (1)$$

$$a=\frac{1}{\sqrt{\alpha}}$$

$$R=\frac{k+1}{\frac{\gamma}{\alpha}-1}$$

$$K=2=\frac{k}{k+1}\left(\frac{\gamma}{\alpha}-1-\frac{\beta}{\sqrt{\alpha}}\right)$$

$$H=K;$$

For capacitive loads $$\left(\frac{1}{R}=0\right)$$

for which $\alpha>\gamma$:

$$a=\frac{1}{\sqrt{\alpha}}$$

$$C=\frac{\frac{\alpha}{\gamma}-1}{k+1}$$

$$K=2+\frac{k}{k+1}\left(\frac{\alpha}{\gamma}-1-\frac{\beta\sqrt{\alpha}}{\gamma}\right)$$

$$H=\frac{\gamma}{\alpha}K$$

These relationships permit the calculation of component values required to achieve any given zero-pole pair. It is to be noted that the selection of the impedance ratio K is somewhat of a compromise since low values of $k$ result in increased sensitivity of the transfer function to changes in amplifier gain, and high values of $k$ require a higher gain amplifier.

In the embodiment shown in FIG. 1, The feedback from the output of amplifier 22 to the input of amplifier 22 (across shunt elements 30 and 31) was made through the leg resistance 27 of the feedback network 27*a*. Alternatively, the feedback may be made through the leg capacitor 24 of the feedback network 27*a*. In this case, the connection of the circuit would be as shown in FIG. 5 where the same numeral is used to designate analogous elements of FIGS. 1 and 5. The output of amplifier 22 is coupled through the leg capacitor 24 and placed across the passive RC network 25, 26, 27, 28, 29. The voltage developed across the network shunt elements 30, 31 is then reintroduced at the input of amplifier 22. The frequency response of the network with feedback connections as shown in FIG. 5 is the same as the frequency response of the network with the feedback connections as shown in FIG. 1; however, the required gain of the amplifier 22 will, in general, be different. Specific solutions for the constants of equation (1) for each case will give the two values of gain. Usually the arrangement which requires the least gain will be preferred.

FIG. 6 is a schematic diagram of a three-stage active RC filter network designed as a band-pass filter centered at a frequency $2\omega_o$ with rejection at $\omega_o$ and $3\omega_o$. Such a filter is useful in various second harmonic detection and control systems in which a sensing circuit is driven at the $\omega_o$ frequency and the condition of a parameter of said sensing circuit is monitored by the detection of the second harmonic component $2\omega_o$ generated by said circuit. To improve the performance of such a system, it is desirable to peak the response at $2\omega_0$(100) and to reject reject both the fundamental drive frequency $\omega_o$ and the third harmonic frequency $3\omega_o$. An example of such a system is a flux-gate magnetometer in which a magnetic core is exposed to a magnetic field to be measure and a variable measuring field is applied to the core. If the core is driven by a primary winding at $\omega_o$, the second harmonic component $2\omega_o$ will be maximum when the measuring field exactly balance the field to be measured. Thus, application of the filter of FIG. 6 to the output of the magnetic core permits sensitive detection of the $2\omega_o$ component, thereby enabling the field to be accurately measured.

Figure 7 is a $p$-plane plot of the positions of the poles marked with an "X" and the zeros marked with a "o" which are established in the upper left quadrant of the $p$-plane by the transfer function of the filter of FIG. 6. The zeros along the J $\omega$ axis are located at DC, $\omega_o$, $3\omega_o$ and infinity. Three poles, $p1$, $p2$ and $p3$, are grouped about $2\omega_o$ to give a sixth-order approximation to the desired band-pass characteristics in the vicinity of $2\omega_o$. It is to be noted that the order of the approximation is equal to twice the number of poles in the upper left quadrant, since the corresponding complex conjugates of these poles are always located in the lower left quadrant. The desired response is obtained in FIG. 6 by connecting three active RC filters 40, 41 and 42 in cascade. The filter 40 is of the type described with reference to FIG. 1 and contributes the zero at $\omega_0$ and the pole at $P_3$The filter 41 is of the type described with reference to FIG. 5 and contributes the zero at $3\omega_o$ and the pole at $p_1$. The filter 42 contributes a pole at $p_2$ and zeros at DC and infinity. The ability of the cascaded network of FIG. 6 to converge on the desired frequency response is attributable to the capability of independently locating the $\omega_o$ zero and the $p_3$ pole with the filter stage 40, and of independently locating the $3\omega_o$ zero and the $p_1$ pole with the filter stage 41, as previously described with reference to FIGS. 1 and 5.

In a typical example of the network of FIG. 6, $2\omega_0$ may be 10 kHz. with a desired bandwidth for the response abut $2\omega_o$ (distance between −3db. points) of 2 kHz. The location of poles $p_1$, $p_2$ and$p_3$ which satisfy these boundary conditions can be readily calculated as $p_1$=−0.05+$j$1.087,$p_2$=−0.10+$j$1.00 and $p_3$=−0.45+$j$0.910, where the $p$variable is normalized so that $2\omega_o$ is located at 0+$j$1.00. For convenience, the circuit components of FIG. 6 will be described for this particular example. It will be understood, however, that a different selection of frequencies and bandwidth will result in different specific values of circuit components.

For the particular example given, and input signal $E_i$ is impressed upon a 10k resistor 44, which serves only as a terminating resistor, at input terminals 45 and across the lower part of a passive twin-T RC network 46. The lower T of the network 46 comprises a 110 pf. leg capacitance 47, a 44.8 k ohm arm resistance 48 and a 100k ohm arm resistance 49. The upper T of network 46 comprises a 11.90 k ohm leg resistance 50, a 1043 pf. arm capacitance 51 and a 563 pf. arm capacitance 52. The lower T is shunted by a 110 pf. load capacitance 53 and a parallel-connected 43.6 k ohm load resistor 54. The voltage across the load elements 53 and 54 is applied to the input of a voltage amplifier 55. The output of the amplifier 55 is fed back via the leg resistance 50 to form an active RC filter, the required gain for the amplifier 55 in this example being 2.23. The output of the filter section 40 from the amplifier 55 is applied to the filter section 41 across the lower T of a passive twin-T RC network 56, the lower T of the network 56 comprising a 18.2 k ohm leg resistance 57, a 511 pf. arm capacitance 58 and a 230 pf. arm capacitance 59, and the upper T of the network 56 comprising a 1,132 pf. leg capacitance 60, a 18.3 k ohm arm resistance 61 and a 34.2 k ohm arm resistance 62. The lower T is shunted by a 100k ohm load resistance 63 and a parallel-connected load capacitance 64 of 303 pf. The voltage across the load elements 63 and 64 is applied to the input of a voltage amplifier. The output of the amplifier 65 is fed back via the leg capacitance 60 to form a second active RC filter, the required gain for the amplifier 65 in this example being 2.60. The output of the filter section 41 from the amplifier 65 is applied to the filter section 42 and is impressed via a passive RC network comprising 50 k ohm resistance 66, 317pf. capacitance 67, 317 pf. capacitance 68, and 100k ohm resistance 69 to the input of a voltage amplifier 70, of a 2.8 gain. The output of the amplifier 70 is fed back via a 50k ohm resistance 71 to the junction of elements 66 and 67 to thereby form a third active RC filter. Finally, the output $E_o$ of the three-section filter of FIG. 6 is taken from the output of the amplifier 70 at output terminals 72.

Figure 9 is a schematic diagram of a voltage amplifier particularly useful in the active RC filters of the present invention. This is a DC amplifier comprising three amplifier transistors 75, 76 and 77. The arrangement of input, output and power supply terminals is apparent from the drawing and so will not be described here in detail. The transistors 75 and 76 constitute a differential stage, and the transistor 77 constitutes a complementary gain stage with feedback applied to the base of transistor 76. The use of positive and negative supplies allows input and output at zero DC potential so that no DC effect occurs when the gain is adjusted. A significant feature is that no resistor is used in series with the emitter of transistor 77. This is important in producing a high open-loop gain, high input impedance, and low output impedance. A high open-loop gain, on the order of 1,000, is required to eliminate the effect of forward path elements on gain stability. The high input impedance and low output impedance permit the cascading of filter sections without appreciable interaction. No capacitors are used in the amplifier circuit and, since the input and output terminals are at zero potential, no coupling capacitors are required between the filter stages. This makes the configuration particularly suited to integrated circuit techniques. The following is a typical set of components which may be used in the amplifier circuit of FIG. 9 for a closed loop voltage gain of 2.0.

Transistors 75 and 76: 2n2484

Transistor 77: 2N1132

Resistor 79: 50k ohm Resistor 78: 10K ohm

Resistors 81 and 82: 20k ohm Resistor 80: 20K ohm In this case the open-loop gain is greater than 1500, the operating input impedance is greater than 50M, the output impedance is less than 25ohms and the bandwidth is $4MH_3$.

If lower output impedance and higher open-loop gain are required, a fourth amplifier transistor 83 may be added to the circuit as shown in figure 10. In a typical example, the transistor 83 is type 2N2484 and the added resistor 84 is 50k ohm. The other elements in this example are the same as those given for the like-numbered elements in the described example of FIG. 10.

Using the amplifier circuit of FIG. 9 for the amplifiers 55, 65 and 70 of the active RC filter of Figure 6, and using the above-described example of FIG. 6 where $2\omega_o$ =10 kHz. the measured frequency response of FIG. 8 was obtained for the complete system of FIG. 6. In this case, the vertical axis is linearly calibrated in db. units with the range from the peak response at $2\omega_o$ to the horizontal axis being 70 db.

Figure 11 is a schematic diagram of a three-stage active RC filter network designed as a low-pass filter, the complex transfer function having six poles and four zeros with a passband ripple of 0.18 db. and a stop-band attenuation minimum of 39.3 db. The required poles and zeros in the upper left quadrant of the *p*-plane, with normalized units, are shown in FIG. 12. The desired response is obtained in FIG. 11 by connecting three active RC filters 90, 91 and 92 in cascade. The filter 90 is of the type described with reference to FIG 1 and contributes the $z_1$zero and the $p_1$ pole. The filter 91 is also of the type described with reference to FIG. 1 and contributes the $z_2$ zero and the $p_2$ pole. The filter 92 contributes the $p_3$pole. The ability of the cascaded network of FIG. 11 to converge on the desired frequency response is attributable to the capability of independently locating the $z_1$ zero and the $p_1$ pole with the filter stage 90, and of independently locating the $z_2$ zero and the $p_2$ zero and the $p_2$ pole with the filter stage 91.

For convenience, the circuit components of FIG. 11 will now be described by reference to a specific typical low-pass filter with a cutoff frequency (−0.18 db.) of 3180 Hz., the zeros being located at 3,925 and 4980 Hz. The input signal Ei at input terminals 93 is impressed across the lower part of a passive twin-T RC network 94. The lower T of network 94 comprises a 957 pf. leg capacitance 95, a 50k ohm arm resistance 96 and a 100k ohm arm resistance 97. The upper T of network 94 comprises a 33.3 k ohm leg resistance 115, a 638 pf. arm capacitance 116 and a 319pf. arm capacitance 117. The lower T is shunted by a 278pf. load capacitance 98. The voltage across the load element 98 is applied to the input of a voltage amplifier 99. The output of the amplifier 99 is fed back via the leg resistance 115 to from an active RC filter, the required gain for the amplifier 99 in this example being 2.762. The output of the filter section 90 from the amplifier 99 is applied to the filter section 91 across the lower T of a passive twin-T RC network 100, the lower T of the network 100 comprising a 1,215 pf. leg capacitance 101, a 50k ohm arm resistance 102 and a 100k ohm arm resistance 103, and the upper T of the network 100 comprising a 33.3 k ohm leg resistance 104, a 810 pf. arm capacitance 105 and a 405 pf. arm capacitance 106. The lower T is shunted by a 230 pf. load capacitance 107.

The voltage across the load element 107 is applied to the input of a voltage amplifier 108. The output of the amplifier 108 is fed back via the leg resistance 104 to form a second active RC filter, the required gain for the amplifier 108 in this example being 2.074. The output of the filter section 91 from the amplifier 108 is applied to the filter section 92 and is impressed via a passive RC network comprising 50k ohm resistance 109, 107k ohm resistance 110 and 1,000 pf. capacitance 111, to the input of a voltage amplifier 112. The output of the amplifier 112 is fed back via a 1,000 pf. capacitance 113 to the junction of elements 109 and 110 to thereby form a third active RC filter. Finally, the output $E_o$ of the three-section filter of FIG. 11 is taken from the output of the amplifier 112 at output terminals 114. The measured response for this specific example of the filter of FIG. 11, wherein the amplifiers 99, 108 and 112 are of the type described by reference to FIG. 9, is shown in FIG. 13.

FIGURE 14 is a schematic circuit diagram of a simplified form of low-pass filter using a third-order function. The desired response is obtained by connecting an active RC filter 120 in cascade with a passive RC filter 121. The filter 120 is of the type described with reference to FIG. 1 and contributes a rejection frequency zero on the $j\omega$-axis and a response pole in the upper left quadrant of the *p*-plane. The filter 121 is a conventional passive filter which contributes a pole on the $-\sigma$ axis of the *p*-plane. For a normalized 3 db. cutoff frequency of 1 r.p.s. and a rejection frequency (zero) of 2 r.p.s., typical normalized values of the impedances of filter 120 are as follows:

| | |
|---|---|
| Lower leg capacitance **122**: | 1.000 farads |
| Lower arm resistance **123**: | 1.000 ohms |
| lower arm resistance **124**: | 1.000 ohms |
| Upper leg resistance **125**: | 0.5000 ohms |
| Upper arm capacitance **126**: | 0.5000 farads |
| Upper arm capacitance **127**: | 0.5000 farads |
| Load resistance **128**: | infinite |
| Load capacitance **129**: | 1.335 farads |
| Gain of amplifier **130**: | 2.52 |

For this same example, the normalized impedances of passive filter 121 are 0.8175 ohms for resistance 131 and 1.0000 farad for capacitance 132. Again it is important to realize that an optimum convergence of this third-order approximation is possible by the ability to independently locate the zeros and poles of the transfer function of filter 121.

It will be apparent to those skilled in the art that the basic filter element as shown in FIGS. 1 and 5 can be used to obtain any desired response, as such elements give complete design freedom in the location of transfer function poles relative to the transfer function zeros. Such filter elements can readily be combined in cascade with each other and with conventional filter elements to achieve the required distribution of poles and zeros needed for any desired order of approximation to an ideal response. The poles and zeros (and the transfer functions) necessary to produce innumerable low-pass, high-pass, band-pass and band-elimination filters (with a variety of slopes) may be found in Design Theory and Data for Electrical Filters, J. K. Skwirzynski, D. Van Nostrand Company, Ltd., 1965.

It is to be understood that modifications and variations of the embodiments of the invention disclosed herein may be resorted to without departing from the spirit of the invention and scope of the appended claims.

Having thus described my invention, what I claim as new and desire to protect by Letters Patent is:

1. A second-order active RC filter with a transfer function permitting the poles to be positioned independently of the zeros comprising an inductanceless impedance, a passive RC network having an input for receiving signals to be filtered and an output connected to said impedance, a noninverting voltage amplifier for amplifying the voltage across said impedance, said amplifier having an output, a feedback path connected between said amplifier output and said RC network, said zeros of said filter being on the $j\omega$ axis of the *p*-plane, the magnitude of said impedance and the gain of said amplifier determining the placement of said poles independently of the location of said zeros.

2. Apparatus as defined in claim 1 wherein the radial distance of said poles from the origin of said *p*-plane is a function of said magnitude of said impedance.

3. Apparatus as defined in claim 1 wherein the angular position of said poles with respect to the origin of said *p*-plane is a function of said amplifier gain.

4. Apparatus as defined in claim 1 wherein the passive RC network comprises first and second T-networks, said first network having two capacitive arms and a resistive leg, and said second T-network having two resistive arms and a capacitive leg.

5. A second-order active RC filter with a transfer function permitting the poles to be positioned independently of the zeros comprising first and second input terminals, first and second output terminals, said second input terminal being connected to said second output terminal, a noninverting voltage amplifier having an input and an output, said amplifier output being connected to said first output terminal, a four-terminal passive RC network, said terminals of said network being connected to said first input terminal, said second input terminal, said amplifier input, and said amplifier output, respectively, an inductanceless impedance connected between said amplifier input and said second output terminal, the magnitude of said impedance and the gain of said amplifier determining the placement of said poles of transmission independently of the location of the zeros of transmission.

6. Apparatus as defined in claim 5 wherein said passive RC network has a given rejection frequency and the overall transfer function of said filter is $$\frac{E_o}{E_i}=\frac{H(p^2+\alpha)}{p^2+\beta p+\gamma}$$

7. A second-order active RC network with a transfer function permitting the poles to be positioned independently of the zeros comprising first and second input terminals, first and second output terminals, said second input terminal being connected to said second output terminal, a noninverting voltage amplifier having an input and an output, said amplifier output being connected to said first output terminal, a first three-terminal T-network comprised of resistors and capacitors, said three terminals being connected to said first input terminal, said second input terminal and said amplifier input, respectively, a second three-terminal T-network comprised of resistors and capacitors, said three terminals of said second T-network being connected to said first input terminal, said amplifier input terminal and said amplifier output terminal, respectively, and an inductanceless impedance connected between said amplifier input and said second output terminal.

8. Apparatus as defined in claim 7 wherein said first T-network has two resistive arms and a capacitive leg, and said second T-network has two capacitive arms and a resistive leg.

9. Apparatus as defined in claim 7 wherein said first T-network has two capacitive arms and a resistive leg, and said second T-network has two resistive arms and a capacitive leg.

10. A second-order active RC filter with a transfer function enabling the poles of transmission to be located in the left-half of the $p$-plane independently of the zeros of transmission comprising first and second input terminals, a noninverting voltage amplifier having an input and an output, first and second output terminals, said output of said amplifier being connected to said first output terminal, said second input terminal being connected to said second output terminal, first and second resistors connected in series between said first input terminal and said amplifier input, first and second capacitors connected in series with each other and connected in shunt with said first and second resistors, a third capacitor connected between said node of said first and second resistors and said second input terminal, a third resistor connected between said amplifier output and the node of said first and second capacitors, and an inductanceless impedance connected between said amplifier input and said second output terminal.

11. An active RC filter as defined in claim 10 wherein the magnitude of said impedance and the gain of said amplifier determines the placement of said poles independently of the location of said poles.

12. An active RC filter as defined in claim 11 wherein the radial distance of said poles from the origin of the $p$-plane is a function of said magnitude of said impedance.

13. An active RC filter as defined in claim 11 wherein the angular position of the poles with respect to the origin of the $p$-plane is a function of said amplifier gain.

14. An active RC filter as defined in claim 10 wherein each of said resistors is replaced with a capacitor, and each of said capacitors is replaced with a resistor.

15. An active RC filter as defined in claim 14 wherein the magnitude of said impedance and the gain of said amplifier determines the placement of said poles independently of the location of said poles.

16. An active RC filter as defined in claim 15 wherein the radial distance of said poles from the origin of the $p$-plane is a function of said magnitude of said impedance.

17. An active RC filter as defined in claim 15 wherein the angular position of the poles with respect to the origin of the $p$-plane is a function of said amplifier gain.

18. An active RC filter comprising first and second input terminals, a noninverting amplifier having an input and an output, first and second resistors connected in series between said first input terminal and said amplifier input, a first capacitor connected between said first and second resistors and said second input terminal, second and third capacitors connected in series between said first input terminal and said amplifier input, first and second output terminals, said first output terminal being connected to said amplifier output, said second input terminal being in common with said second output terminal, a third resistor being connected between said second and third capacitors and said amplifier output, a fourth resistor connected between said amplifier input and said second output terminal, said resistors and amplifiers having the following normalized values:

first resistor, unity
second resistor, $k$
third resistor, $$\frac{k}{k+1}$$

fourth resistor, R
first capacitor, $$a\left(\frac{k+1}{k}\right)$$

second capacitor, $a$
third capacitor, $a/k$;

the transfer function of said active RC filter being $$\frac{E_o}{E_i}=\frac{H(p^2+\alpha)}{p^2+\beta p+\gamma}$$

and $$a=\frac{1}{\sqrt{\alpha}}$$

$$R=\frac{k+1}{\frac{\gamma}{\alpha}-1}$$

$$K=2+\frac{k}{k+1}\left(\frac{\gamma}{\alpha}-1-\frac{\beta}{\sqrt{\alpha}}\right)$$

$$=\text{amplifier gain}$$

$$H=K$$

19. An active RC filter comprising a noninverting amplifier having an input and an output, a first and second input terminal, first and second resistors connected in series between said first input terminal and said amplifier input, a first capacitor connected between said node of said first and second resistors and said second input terminal, second and third capacitors connected in series and jointly connected in shunt with said first and second resistors, first and second output terminals, said amplifier output being connected to said first output terminal, said second input terminal being in common with said second output terminal, a third resistor being connected between said junction of said second and third capacitors and said output of said amplifier, a fourth capacitor connected between said input of said amplifier and said second output terminal, said resistors and capacitors having the following normalized values:

first resistor, unity
second resistor, $k$
third resistor, $$\frac{k}{k+1}$$

first capacitor, $$a\left(\frac{k+1}{k}\right)$$

second capacitor, $a$
third capacitor $a/k$;
fourth capacitor, $a$C;

the transfer function of said active RC filter being $$\frac{E_o}{E_i}=\frac{H(p^2+\alpha)}{p^2+\beta p+\gamma}$$

and $$a=\frac{1}{\sqrt{\alpha}}$$

$$C=\frac{\frac{\alpha}{\gamma}-1}{k+1}$$

$$K=2+\frac{k}{k+1}\left(\frac{\alpha}{\gamma}-1-\frac{\beta\sqrt{\alpha}}{\gamma}\right)$$

=amplifier gain $$H=\frac{\gamma}{\alpha}K$$